Nov. 14, 1961  R. FRITSCH  3,008,184
WORM PRESS
Filed April 5, 1960
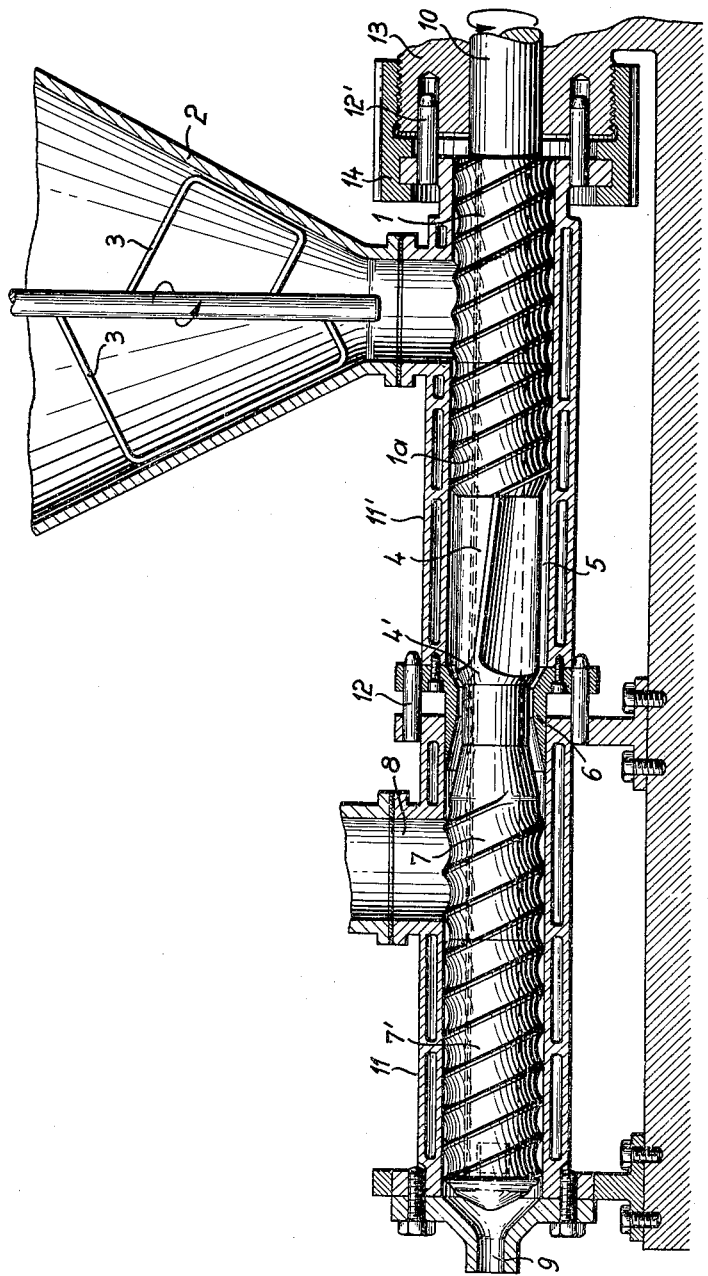

›
United States Patent Office 3,008,184
Patented Nov. 14, 1961

3,008,184
WORM PRESS
Rudolf Fritsch, Stuttgart-Feuerbach, Germany, assignor to Werner & Pfleiderer, Stuttgart-Feuerbach, Germany, a company of Germany
Filed Apr. 5, 1960, Ser. No. 20,206
Claims priority, application Germany Apr. 10, 1959
6 Claims. (Cl. 18—12)

The invention relates to worm presses for working masses of pliable or pasty consistency, and more particularly, to worm presses for mixing, kneading, homogenizing and extruding pliable masses such as plastics, doughs and pastes.

There are known worm presses in which the working pressure and the duration of the stay of the mass in the working chamber of the working portion of the press are controlled on one hand by the threaded portion of an input worm which transports the mass under pressure, and on the other hand by the transfer resistance experienced by the mass when passing to an extrusion worm. The extrusion worm is divided in at least two portions of which the one closest to the working portion transports the mass substantially without pressure while the portion closest to the extrusion mouth is a worm portion in which the extrusion pressure is built up. Worm presses of this kind afford the important advantage that they are suitable for pliable masses of any kind. However, the working portion and the worm portion anterior and posterior in reference to the working portion must be adapted to the mass to be worked. While the specific structures of the working portion and the worm portions are without critical significance, provided they are designed in accordance with the mass to be worked, it is essential that the working such as mixing, kneading and homogenizing of the mass are always entirely completed within the working chamber since any incomplete working of the mass in the working chamber cannot be subsequently completed in the extrusion worm which follows the working portion. Consequently, it is of critical importance that the duration of the stay of the mass in the working chamber is so controlled that the mass when it leaves this chamber, that is when it is passed to the extrusion worm, is completely homogenized, or plasticized in the event of working of plastics. In this connection, the extrusion worm especially the portion thereof adjacent to the working portion is highly significant since the transfer of the mass from the working portion to the extrusion worm depends upon the characteristics of said next adjacent worm portion and, more particularly upon the pitch and the length of the thread thereof.

It is the broad object of the invention to provide a worm press of the general kind above referred to, in which it is not necessary to exchange in a press the aforesaid worm portion next posterior of the working portion assuming that all the other worm portions and other components of the press are correctly selected in accordance with the mass to be worked—when certain variations in the consistency of the mass to be worked should occur. Such variations may occur in plastics, for instance, due to changes in the proportion of the softener additives, or in doughs due to changes in the quantities of the added liquefiers.

A more specific object of the invention is to provide a worm press of the general kind above referred to, in which an exchange of the worm portion of the extrusion worm next adjacent to the working portion is not necessary as frequently as in presses as heretofore known in order to obtain the correct transfer resistance experienced by the mass when passing from the working portion to the extrusion worm and to force upon the mass the required duration of the stay in the working chamber of the working portion.

Another more specific object of the invention is to provide in a worm press of the general kind above referred to, means for gradually regulating the mass transfer resistance within a wide range thereby permitting use of the same extrusion worm portion for masses having different properties.

Another specific object of the invention is to provide a novel and improved worm press of the general kind above referred to, the structure of which greatly reduces the inventory of different extrusion worm portions that must be maintained in order to work masses of different characteristics in the same press. This affords the advantage that the operating costs are considerably reduced and that the press can be utilized more efficiently as to production and time than was heretofore possible.

Other and further objects, features and advantages of the invention will be pointed out hereinafter and set forth in the appended claims constituting part of the application.

Basically, the concept of the invention resides in providing between the working portion and the portion of the extrusion worm which transports the mass substantially without pressure, a throttling means which is adjustable to vary the mass transfer resistance in accordance with the specific characteristics of the mass to be worked.

More specifically, the casing of a press according to the invention is subdivided in the zone in which the mass passes from the working portion to the portion of the extrusion worm which transports the mass substantially without pressure. One of the casing parts thus formed is mounted stationarily and the other part is slidably telescoped into the stationary part and supports said throttling means. Such arrangement permits a convenient adjustment of the throttling means and with it of the mass transfer resistance. The adjustment of throttling means can be effected from the outside of the press in a convenient and gradual manner.

In the single figure of the accompanying drawing, a preferred embodiment of the invention is shown by way of illustration and not by way of limitation. More specifically, the figure shows an elevational, sectional view of a worm press according to the invention.

Referring now in detail to the figure, the worm press comprises an input or feed worm 1 to which the mass to be worked is supplied from a hopper 2. An agitator 3 or other suitable agitating means is preferably provided within the hopper. Portion 1a of worm 1 serves to transport the mass under pressure. This portion is followed by a working portion 4 including a working chamber 5. In this chamber the mass is completely worked, that is, mixed, kneaded and homogenized, or plasticized. The duration of the stay of the mass within chamber 5, which is necessary to assure such complete working, is adjustable according to the invention by means of a throttling device 6 which can be gradually adjusted from the outside of the press in reference to the end portion 4' of the working portion. As is evident, displacement of the throttling device in reference to the end 4' of the kneading portion results in a variation of the clear width of the slot 4a through which the mass passes from working portion 4 to the directly following worm portion 7 which transports the mass substantially without pressure. As is further evident, the transfer resistance which the mass experiences when moving to worm portion 7 and also the duration of the stay of the mass in working chamber 5 are controlled by the width of the slot. Accordingly, the throttling device 6 permits a regulation of the mass transfer resistance and with it of the duration of the stay of the mass in working chamber 5 so that by appropriate adjustment of device 6 the entire mass within chamber 5 can be caused to remain within the chamber for a period of time sufficient to effect a thorough mixing, kneading and homogenizing or plasticizing of the mass before it is passed on to worm portion 7. Worm portion 7 communicates with a duct 8 for the discharges of gases. Such discharge of gases is particularly necessary when plastics are treated and duct 8 may be visualized as being connected to a gas suction device. In the event that the masses to be worked need not be degasified, duct 8 may be closed.

The pressure necessary for extruding the mass through the discharge mouth 9 is built up in the extrusion worm by a worm portion 7' which follows worm portion 7.

All the worm portions and also the working portion are exchangeably mounted on a common shaft 10 in a well known manner so that worm portions can be selected which have threads in accordance with the specific requirements of the mass to be worked. However, whereas heretofore it was necessary to replace worm portion 7 for each of the minor changes in the consistency of the mass and with it of the mass transfer resistance which frequently occur in practice, such frequent exchange of worm section 7 which is cumbersome and time-consuming, is not necessary in a press according to the invention. In presses as heretofore known, worm portion 7 serves not only as a means for a substantially pressureless transport of the mass but also as a means for controlling the duration of the stay of the mass in working chamber 5 by selecting accordingly the pitch of the threads of worm portion 7. In contradistinction thereto, in a press according to the invention, worm portion 7 merely serves to transport the mass substantially without pressure and is relieved of its function to control the duration of the stay of the mass. This latter function is now assigned to the throttling device 6. The throttling device can be adjusted gradually from the outside. For this purpose, the casing of the press is divided in two parts, 11 and 11'. Part 11 is stationarily mounted and part 11' is axially displaceable. An axial guidance of casing part 11' is effected by means of suitable guiding members shown as guide bolts 12 and 12'. The bolts guide casing part 11' in stationary casing part 11 and also in a block 13. This block also supports shaft 10 and thus guides casing parts 11 and 11' in axial alignment. Adjustment is effected by means of a threaded ring 14 which is engaged by an end flange of casing part 11' and is screwed upon an externally threaded portion of block 13. As is evident, rotation of ring 14 effects a corresponding axial displacement of casing part 11' and with it of throttling device 6 mounted thereon. As a result, the mass transfer resistance experienced by the mass moving from chamber 5 to worm portion 7 through slot 4a can be accurately and gradually adjusted. Throttling device 6 is telescopically extended into casing part 11 with a close fit.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A worm press for working and extruding a pliable mass, said press being of the kind having an input worm, an extrusion worm and a working portion including a working chamber, the working pressure and the duration of the stay of the mass in the working chamber of said working portion being controlled by a pressure feed section of the input worm and also by the transfer resistance experienced by the mass when passing from the working chamber to the extrusion worm, said extrusion worm including at least two sections of which the one next adjacent to the working portion transports the mass substantially free of pressure and the one next to an extrusion outlet of the press builds up extrusion pressure, in combination with an adjustable throttling means for varying the transfer resistance experienced by the mass when passing from the working portion to the substantially pressure free transporting section of the extrusion worm, said throttling means being interposed between said working portion and said extrusion worm section and comprising a press casing housing said worms and said working portion and including a passage duct for said mass joining said working portion and said substantially pressure free transport section of the extrusion worm, said casing being divided in two parts, one of said parts being stationarily mounted and the other being telescoped into said stationary part and slidable in reference thereto, a passage control member mounted on said slidable casing part and movable in unison therewith, said control member extending into said duct to control the free passage area thereof by the position of the control member within the duct, and an adjustment means coacting with said slidable casing part for varying the axial position thereof thereby correspondingly varying the position of the control member in the duct.

2. A worm press according to claim 1 wherein said adjustment means is gradually adjustable.

3. A worm press according to claim 1 wherein said adjustment means are operable from the outside of the press.

4. A worm press according to claim 1 wherein said input worm, said working portion and said extrusion worm are disposed in axial alignment, and said casing is divided in said two parts in a plane transverse of a zone in which the mass passes from said working portion to said substantially free of pressure transporting section of the extrusion worm.

5. A worm press according to claim 4 wherein a screw means coacts with said slidable casing part from the outside thereof to displace said part in reference to the stationary part thereby effecting a gradual adjustment of the control member.

6. A worm press for working and extruding a pliable mass, said press being of the kind having an input worm, an extrusion worm and a working portion including a working chamber, the working pressure and the duration of the stay of the mass in the working chamber of said working portion being controlled by a pressure feed section of the input worm and also by the transfer resistance experienced by the mass when passing from the working chamber to the extrusion worm, said extrusion worm including at least two sections of which the one next adjacent to the working portion transports the mass substantially free of pressure and the one next to an extrusion outlet of the press builds up extrusion pressure, in combination with an adjustable throttling means for varying the transfer resistance experienced by the mass when passing from the working portion to the substantially pressure-free transporting section of the extrusion worm, said throttling means being interposed between said working portion and said extrusion worm section, and comprising a press casing housing said worms and said working portion and including a passage duct for said mass joining said working portion and said substantially pressure-free transport section of the extrusion worm, said casing being divided in two parts, one of said parts being stationarily mounted and the other being slidable in reference to the stationary part, a passage control member mounted on one of said parts, said control member extending into said duct to control the free passage area thereof by the position of the control member within the duct, and an adjustment means coacting with said slidable casing part for varying the axial position thereof in reference to the stationary part thereby correspondingly varying the position of the control member in the duct.

References Cited in the file of this patent

UNITED STATES PATENTS

| Re. 23,880 | Heston | Sept. 28, 1954 |
| 2,519,014 | Bankey | Aug. 15, 1950 |

OTHER REFERENCES

Sackett et al.: "Speaking of Extrusion," SPE Journal, November 1957, pp. 49–51.